A. McNAIR.
Car Truck.

No. 35,244.

Patented May 13, 1862.

Witnesses:
Alexander N. Hays
James Loud

Inventor:
Alexander McNair

UNITED STATES PATENT OFFICE.

ALEXANDER McNAIR, OF NEWARK, NEW JERSEY.

IMPROVEMENT IN RUNNING-GEAR OF CARS FOR STREET-RAILWAYS.

Specification forming part of Letters Patent No. 35,244, dated May 13, 1862.

*To all whom it may concern:*

Be it known that I, ALEXANDER McNAIR, of Newark, in the county of Essex and State of New Jersey, have invented a new and useful Improvement in the Running-Gear of Cars for Street-Railways; and I do hereby declare that the following is a full, clear, and exact description of the same, reference being had to the accompanying drawings, forming part of this specification, in which—

Figure 1:
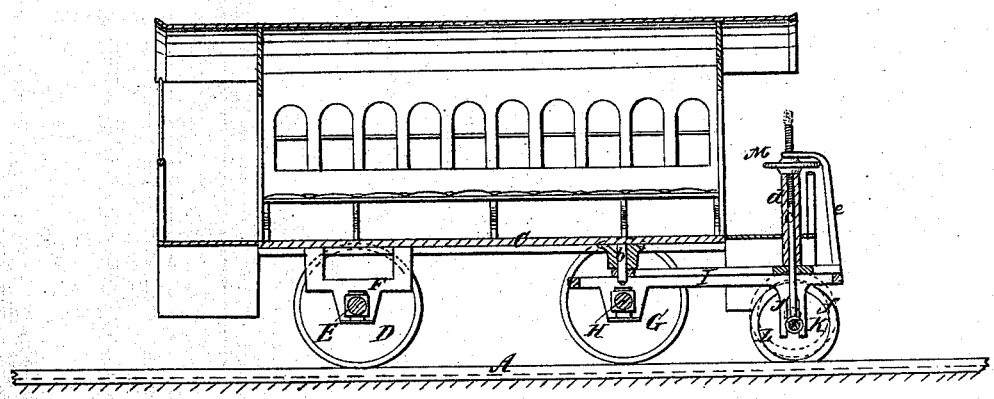
Figure 2:
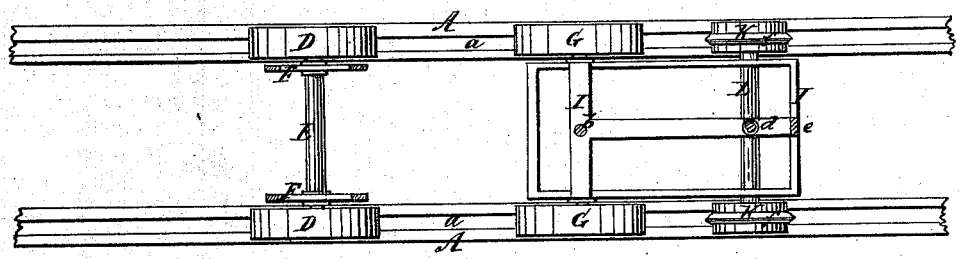
Figure 3:
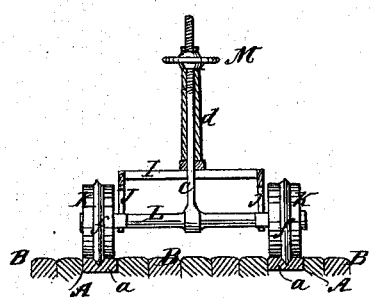

Figure 1 is a side view of a railway-track and a car with my improvement. Fig. 2 is a plan of the track and running-gear of the car. Fig. 3 is a transverse section of the same.

Similar letters of reference indicate corresponding parts in the several figures.

The object of this invention is to enable a street-railway car to run off the track when it becomes desirable to do so, in case of any obstruction or under other circumstances.

In carrying out the invention I construct the track with two flat-surfaced grooved rails and construct the main wheels of the car without flanges and arrange the front pair of the said wheels in a truck attached to the car by a king-bolt.

To enable others to apply my invention, I will proceed to describe it with reference to the drawings.

A A are rails, each having a central groove, $a$, and a flat surface on each side of the said groove, said surface being flush with the roadway B.

C is the floor-frame of the car.

D D are the hind main wheels, and E their axle, having its boxes arranged in housings F F, rigidly attached attached to the car.

G G are the front main wheels, and H their axle, having its boxes fitted to housings in the truck I, which is attached by a king-bolt, $b$, to the floor-frame C, and which supports the front end of the car and projects some distance in front of the body thereof. To this truck the housings J J of the axle-boxes of the flanged guide-wheels K K are rigidly attached. The axle L of the guide-wheels has secured to it the upright screwed rod $c$, which passes through a fixed upright sleeve, $d$, supported on the front part of the truck I. This rod $c$ has its screw-thread fitted with a nut which is secured or formed in the hub of a hand-wheel, M, which is supported on the top of the sleeve $d$, and which is confined thereto by a standard, $e$, secured to the front part of the truck.

By turning the nut-wheel M the screwed rod $c$ is raised or lowered, according to the direction in which the said nut is turned, and the axle L and guide-wheels K are raised or lowered with the said rod, the boxes of the axle L moving up and down in the housings J J, independently of the truck. When running on the track, the guide-wheels are kept down, with their flanges $f f$ in the grooves $a a$ of the rails, by a proper adjustment of the nut-wheel, and the said wheels being kept in the track cause the front main wheels, G G, to follow them, whether running straight or in curves, and the hind main wheels, D D, follow the front ones. When it is desired to run off the track, the nut-wheel is turned by the driver or other person on the front platform and the guide-wheels raised out of the grooves of the track, as shown in red outline in Fig. 1, and the car is then free to run off the rails and on the roadway B in any direction, in the same way as an ordinary carriage. When it is desired to run on the track again, the horses are guided to bring the wheels G G on the rails and the nut is turned in the opposite direction to lower the guide-wheels onto the rails and bring their flanges into the grooves of the rails.

I do not claim, broadly, the combination of a grooved track and flanged guide-wheels capable of being raised from the track; but

What I claim as my invention, and desire to secure by Letters Patent, is—

The combination, with the axle H and floor-frame C, of the projecting pivoted truck I, flanged wheels K K, axle L, standard $e$, and adjusting screw-rod $c$, in the manner and for the purpose herein shown and described.

ALEXANDER McNAIR.

Witnesses:
JAMES LAIRD,
ALEXANDER N. HAY.